United States Patent
Maar et al.

(10) Patent No.: US 11,230,933 B2
(45) Date of Patent: Jan. 25, 2022

(54) BLADE FOR A HIGH-SPEED TURBINE STAGE HAVING A SINGLE SEALING ELEMENT

(71) Applicant: MTU Aero Engines AG, Munich (DE)

(72) Inventors: Karl Maar, Pfaffenhofen am der Ilm (DE); Joerg Frischbier, Dachau (DE); Hermann Klingels, Dachau (DE); Jens Wittmer, Pfaffenhofen a. d. Ilm (DE); Martin Pernleitner, Dachau (DE)

(73) Assignee: MTU Aero Engines AG, Munich (DE)

( * ) Notice: Subject to any disclaimer, the term of this patent is extended or adjusted under 35 U.S.C. 154(b) by 10 days.

(21) Appl. No.: 16/793,384

(22) Filed: Feb. 18, 2020

(65) Prior Publication Data
US 2020/0271002 A1  Aug. 27, 2020

(30) Foreign Application Priority Data
Feb. 21, 2019  (DE) .......................... 102019202387.8

(51) Int. Cl.
| F01D 5/28 | (2006.01) |
| F01D 5/14 | (2006.01) |
| F02C 7/18 | (2006.01) |
| F02C 7/36 | (2006.01) |

(52) U.S. Cl.
CPC ............. *F01D 5/284* (2013.01); *F01D 5/142* (2013.01); *F01D 5/288* (2013.01); *F02C 7/18* (2013.01); *F02C 7/36* (2013.01)

(58) Field of Classification Search
CPC .......... F01D 5/284; F01D 5/142; F01D 5/288; F01D 5/141; F01D 5/225; F02C 7/18; F02C 7/36; Y02T 50/60; F05D 2240/303; F05D 2250/73; F05D 2260/961
See application file for complete search history.

(56) References Cited

U.S. PATENT DOCUMENTS

| 5,448,828 A | 9/1995 | Willems |
| 5,476,363 A | 12/1995 | Freling et al. |
| 5,660,320 A * | 8/1997 | Hoffmuller ........ B23K 35/0222 |
| | | 228/122.1 |

(Continued)

FOREIGN PATENT DOCUMENTS

| DE | 4310896 C1 | 3/1994 |
| DE | 10 2011086524 A1 | 5/2013 |

(Continued)

OTHER PUBLICATIONS

Wang et al.:"Integrated aerodynamic design and analysis of turbine blades," Advances in Engineering Software 68 (2014) 9-18.

(Continued)

*Primary Examiner* — Jacob M Amick
*Assistant Examiner* — Charles J Brauch
(74) *Attorney, Agent, or Firm* — Davidson, Davidson & Kappel, LLC

(57) ABSTRACT

Described is a blade for a high-speed turbine stage of an aircraft gas turbine, in particular of an aircraft engine, the blade including a radially inner blade root, a radially outer shroud, and an airfoil extending between the blade root and the shroud. It is provided that the outer shroud have only a single sealing element, which projects radially from the shroud, in particular only a single sealing fin.

19 Claims, 2 Drawing Sheets

(56) References Cited

U.S. PATENT DOCUMENTS

| | | | |
|---|---|---|---|
| 5,966,525 A | 10/1999 | Manzi, Jr. et al. | |
| 9,464,530 B2 | 10/2016 | Kareff et al. | |
| 10,006,300 B2 | 6/2018 | Daniels et al. | |
| 2010/0290897 A1* | 11/2010 | Beeck | F01D 11/08 415/173.1 |
| 2014/0301852 A1 | 10/2014 | Zscherp | |
| 2015/0152739 A1* | 6/2015 | Miller | F01D 5/10 416/190 |
| 2016/0146040 A1* | 5/2016 | Simpson | F04D 29/544 60/805 |
| 2016/0238021 A1* | 8/2016 | Furrer | F04D 29/023 |
| 2017/0022827 A1* | 1/2017 | Waldman | F01D 5/3061 |
| 2017/0130588 A1 | 5/2017 | Townes | |
| 2017/0298744 A1* | 10/2017 | Zhang | F01D 5/187 |
| 2018/0030835 A1 | 2/2018 | Ilda et al. | |
| 2018/0209275 A1* | 7/2018 | Abrari | F01D 5/048 |
| 2018/0274368 A1 | 9/2018 | Mongillo et al. | |

FOREIGN PATENT DOCUMENTS

| | | | | |
|---|---|---|---|---|
| DE | 10 2015102396 A1 | 8/2015 | | |
| DE | 112016000685 T5 | 12/2017 | | |
| EP | 2 383434 A2 | 11/2011 | | |
| EP | 2617944 A2 | 7/2013 | | |
| EP | 2626517 A2 | 8/2013 | | |
| EP | 2842662 A1 | 3/2015 | | |
| EP | 3168420 A1 | 5/2017 | | |
| EP | 3170974 | 5/2017 | | |
| EP | 3244011 A2 | 11/2017 | | |
| EP | 1 936119 B1 | 9/2018 | | |
| WO | WO-0225065 A1 * | 3/2002 | | F01D 5/225 |
| WO | WO-2006029983 A1 * | 3/2006 | | F01D 5/187 |
| WO | WO 2017003416 A1 | 1/2017 | | |
| WO | WO2017018981 A1 | 2/2017 | | |

OTHER PUBLICATIONS

Roberts: "The Effect of Variable Chord Length on Transonic Axial Rotor Performance," Journal of Turbomachinery, Jul. 2002, vol. 124, 351.

Lex: "Kurzfassung Masterarbeit: Auswirkungen der Erbringung von Sekundärregelleistung auf die Lebensdauer einer Gasturbinenschaufel," Lehrstuhl für Energie-systeme der Technischen Universität München Aug. 31, 2016, see machine translation.

Chapter 5.9 of Czischos, „Das Ingenieurwissen, 34th edition, Springer Verlag, 2013, see English translation.

* cited by examiner

BLADE FOR A HIGH-SPEED TURBINE STAGE HAVING A SINGLE SEALING ELEMENT

The present invention relates to a blade for a high-speed turbine stage of an aircraft gas turbine, in particular of an aircraft engine.

BACKGROUND

In a high-speed turbine stage, which in particular may be embodied as a low-pressure turbine in an engine having a geared fan, also referred to as geared turbofan (GTF), the linear speed Utip at the blade tip reaches values of 300 m/s and above. In comparison, in turbine stages of conventional engines; i.e., non-high-speed turbine stages rotating at fan speed, the maximum linear speed Utip is 250 m/s.

In this context, the term "high-speed" means that the respective turbine stage is coupled to the fan; i.e., the rotor at the engine inlet, by a gearbox so that during operation, the respective rotor blade ring(s) of this turbine stage rotate(s) faster than the fan.

Directional words such as "axial," "axially," "radial," "radially," and "circumferential" are always taken with respect to the machine axis of the aircraft gas turbine, unless explicitly or implicitly indicated otherwise by the context.

In high-speed turbine stages, the load on the blades and their airfoils is very high. In particular, during operation, the airfoils are exposed to higher foreign particle energy because of the higher linear speeds. Such impacts cause primary and secondary damage to the blades. The primary and secondary damage is the greater, the faster the turbine stage; i.e., the blades rotate in the hot gas stream. In addition, the acting centrifugal forces are noticed to have strong effects on the blades. It should also be borne in mind that typically nickel materials are used for such blades. When using blades made of brittle materials, correspondingly greater wear and damage are noticeable.

SUMMARY OF THE INVENTION

It is an object of the present invention to provide a blade for a high-speed turbine stage that has improved robustness in operation.

The present invention provides a blade for a high-speed turbine stage of an aircraft gas turbine, in particular of an aircraft engine, the blade including a radially inner blade root, a radially outer shroud, and an airfoil extending between the blade root and the shroud. It is provided that the outer shroud have only a single sealing element, which projects radially from the shroud, in particular only a single sealing fin.

"High-speed" may in particular mean that the blade is designed for an An$^2$ of ≥4000 m$^2$/s$^2$, preferably ≥4500 m$^2$/s$^2$, in particular ≥5000 m$^2$/s$^2$ at or around the ADP of the aircraft gas turbine (10) and/or is suitable and/or intended for a correspondingly designed turbine stage/aircraft gas turbine. "An$^2$" is the annulus area A at the exit of the turbine stage multiplied by the square of the rotational speed n. "ADP" stands for "Aerodynamic Design Point;" i.e., the operating condition at cruise altitude, which is also referred to as "cruise condition." In conventional, non-high-speed turbine stages, the An$^2$ at or around the ADP is significantly below 2000 m$^2$/s$^2$.

By providing only one sealing element or sealing fin on the shroud, it is possible to achieve a reduction in the rim load on the blade. By reducing mass in the radially outermost regions of the blade, the acting centrifugal forces can be significantly reduced. This makes it possible, in particular, to reduce the stresses occurring in the airfoil or blade profile. The robustness of the blade against impact loads decreases with increasing stress and decreasing ductility of the blade material. The single sealing element allows for improved robustness, especially with regard to higher speeds and less ductile blade materials.

The airfoil may have a radially inner chord length that is at least 1.1 times, preferably at least 1.2 times, in particular at least 1.3 times a radially outer chord length, the inner chord length being measured at the airfoil directly above the blade root, and the outer chord length being measured at the airfoil directly below the shroud. Thus, the chord length varies very strongly over the radial extent of the airfoil as compared to a conventional turbine blade, where the inner chord length is less than 10% longer than the outer chord length. This may, on the one hand, be disadvantageous from an aerodynamic standpoint, but, on the other hand, allows a particularly advantageous distribution of the mean stress and the section modulus over the blade height. The robustness against impact loads can thereby be further improved, especially at high rotational speeds and for materials with relatively low ductility, in particular brittle materials such as TiAl.

The blade may be made of a brittle material, such as a titanium aluminide alloy. Moreover, the blade may be cast or forged or/and additively manufactured, for example by (selective) electron beam melting (EBM). The term "brittle materials" (e.g., TiAl) is understood to refer to materials in which a maximum total elongation of <2% occurs at room temperature.

The airfoil may have material thickenings, at least in some regions, in particular an at least locally thickened leading edge. This makes it possible to counteract damage caused by the increased foreign particle energy, in particular impacts, and to even further improve the robustness.

The airfoil and/or the sealing element may have a hardfacing formed thereon, at least in some regions, the hardfacing being made from a material different from the material of the blade, in particular from a ceramic material or a Ni-based material. Such a partial or complete hardfacing allows the blade to be reinforced to counteract damage.

Also provided is a turbine stage for a gas turbine, in particular an aircraft gas turbine, having a plurality of above-described blades arranged adjacent one another in the circumferential direction. In such a turbine stage, circumferentially adjacent blades may be configured to have different natural frequencies. To this end, adjacent blades may differ, for example, in the geometry of the airfoil or/and of the shroud.

The shroud may be cooled, for example, by supplying cooling air from the outside of the blade and the shroud. Alternatively or additionally, the blade and/or the shroud may be cooled from the inside. Through cooling of, in particular, the rubbing, thermally particularly stressed radially outer shroud, the temperature of the shroud during operation of the aircraft gas turbine can be reduced. In this way, the temperature-dependent creep behavior can be improved toward increased creep resistance. This makes it possible to choose a more robust and more ductile material, such as, for example, a titanium aluminide (TiAl) alloy having a more ductile microstructure. It is only through cooling that the creep resistance of such material is shifted to the desired range. This, too, makes it possible to further improves robustness.

At least one blade of the turbine stage may have disposed thereon a blade shroud weight that is configured such that a static mean stress of less than 150 MPa is obtained in all sections of the blade profile.

The blade shroud weight may weigh less than 7 grams.

Finally, there is also provided an aircraft engine having an above-mentioned high-speed turbine stage, where, during operation of the aircraft engine, the turbine stage rotates faster than a fan of the aircraft engine. Thus, this aircraft engine is an aircraft engine having what is known as a geared fan; i.e., a geared turbofan (GTF).

In such an aircraft engine, cooling fluid, in particular cooling air, may be supplied to the cooling means in the shroud of the blades of the turbine stage from a region upstream thereof. The cooling air may be provided, for example, through upstream stator vanes.

BRIEF DESCRIPTION OF THE DRAWINGS

The invention will now be described, by way of example and not by way of limitation, with reference to the accompanying drawings.

DETAILED DESCRIPTION

Figure 1:
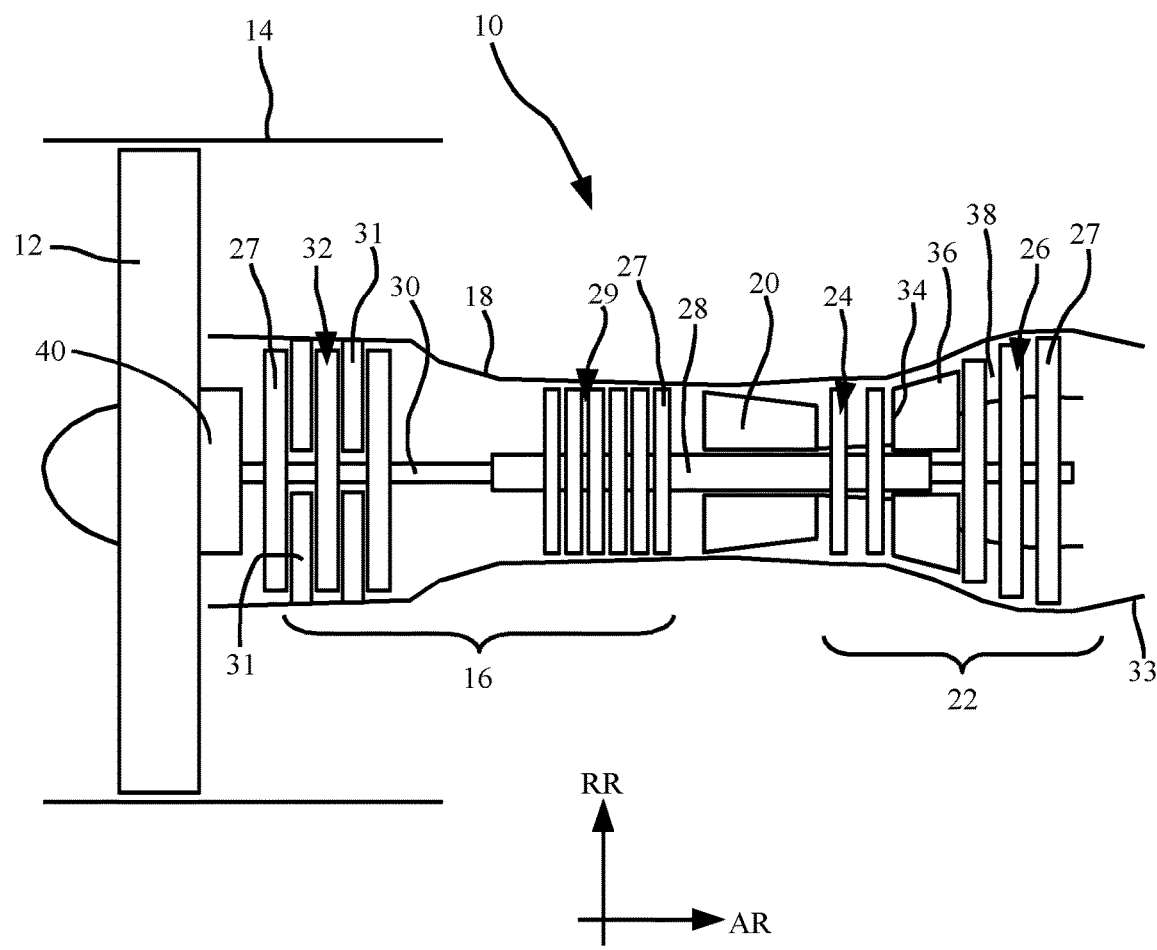
FIG. 1 is a simplified schematic representation of an aircraft gas turbine or aircraft engine.

FIG. 1 shows, in simplified schematic form, an aircraft gas turbine 10, illustrated, merely by way of example, as a turbofan engine. Gas turbine 10 includes a fan 12 that is surrounded by a schematically indicated casing 14. Disposed downstream of fan 12 in axial direction AR of gas turbine 10 is a compressor 16 that is accommodated in a schematically indicated inner casing 18 and may include a single stage or multiple stages. Disposed downstream of compressor 16 is combustor 20. Hot exhaust gas discharging from the combustor then flows through subsequent turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a here low-pressure compressor 32 so that they are jointly driven or rotated. Disposed downstream of turbine 22 is an exhaust nozzle 33, which is only schematically indicated here.

In the illustrated example of an aircraft gas turbine 10, a turbine center frame 34 is disposed between high-pressure turbine 24 and low-pressure turbine 26 and extends around shafts 28, 30. In other designs, instead of a turbine center frame 34, only an intermediate duct may be provided between high-pressure turbine 24 and low-pressure turbine 26. Hot exhaust gases from high-pressure turbine 24 flow through turbine center frame 34 in its radially outer region 36. The hot exhaust gas then flows into an annular space 38 of low-pressure turbine 26. Compressors 29, 32 and turbines 24, 26 are represented, by way of example, by rotor blade rings 27. For the sake of clarity, the usually present stator vane rings 31 are shown, by way of example, only for compressor 32.

In this example, low-pressure turbine 26 and fan 12 are coupled by a gearbox 40, shown only schematically here, in particular a planetary gear. In this way, low-pressure turbine 26 becomes what is known as a high-speed turbine stage, which rotates at a higher speed than fan 12. The direction of rotation of low-pressure turbine 26 may be the same as or different from that of fan 12.

Figure 2:
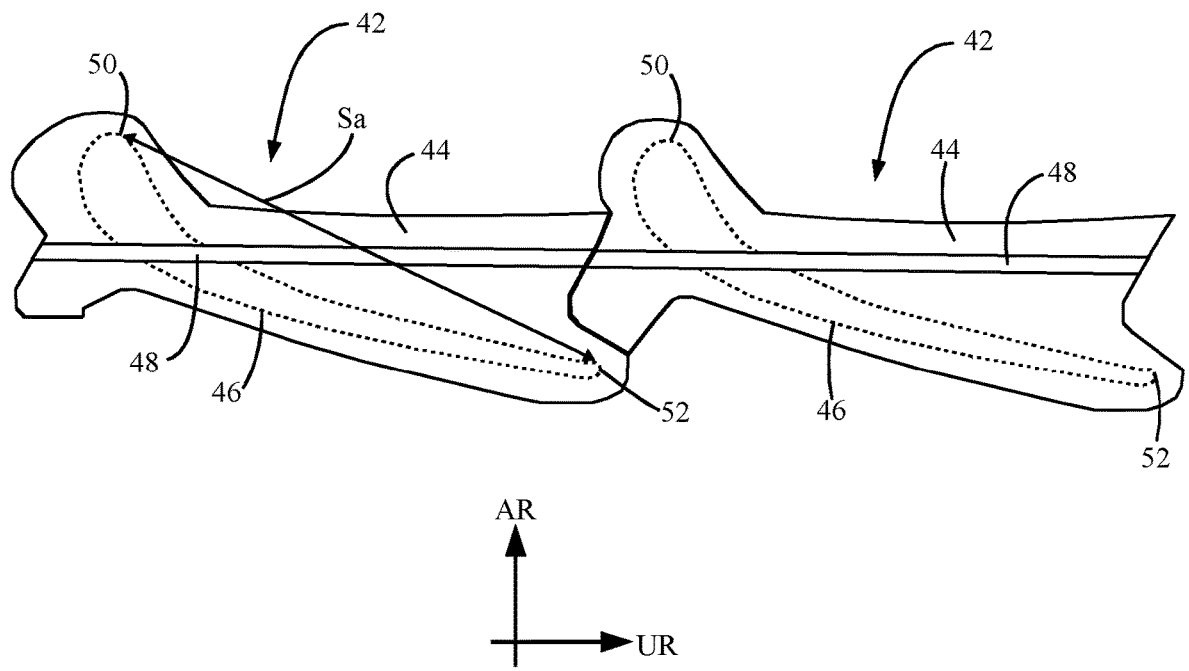
FIG. 2 is a highly simplified, schematic top view looking radially inwardly at two blades of a turbine stage arranged adjacent one another in the circumferential direction.

The following description of an embodiment of the invention relates in particular to a turbine stage of low-pressure turbine 26, in which a plurality of blades 42 according to FIG. 2 are arranged adjacent one another in the circumferential direction.

Blade 42 has a shroud 44 at its radially outer end. Extending radially inwardly from shroud 44 is the airfoil 46. Shroud 44 has disposed thereon a single sealing element 48, in particular a single sealing fin 48. Sealing element 48 extends substantially in circumferential direction UR and projects outwardly from shroud 44 in radial direction RR. In contrast to known blades which typically have two sealing elements, the provision of only one sealing fin 48 in the radially outer region of the blade 42 makes it possible to reduce the mass, which has an advantageous effect on the forces acting on blade 42 during operation.

Figure 3:
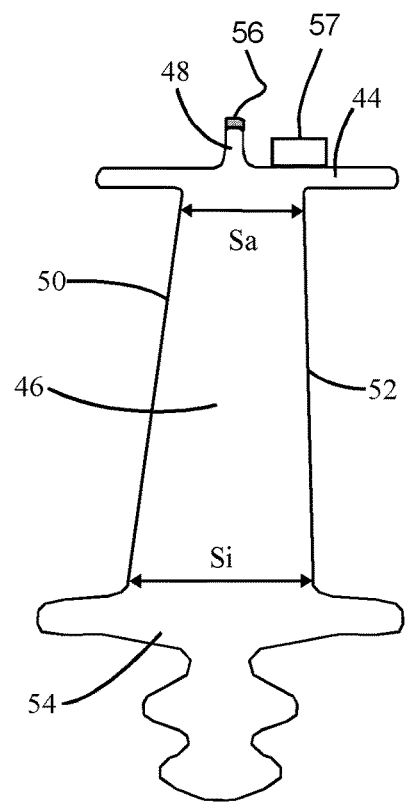
FIG. 3 is a schematic representation of a blade and its chord lengths.

In addition to the provision of only one radially outer sealing fin 48, blade 42; i.e., its airfoil 46, may have different chord lengths Si and Sa in the radially inward and radially outward regions thereof, which is illustrated, by way of example, in FIG. 3. Chord lengths Si and Sa are measured between a leading edge 50 and a trailing edge 52 of airfoil 46, which is also shown in FIG. 2 for the left blade 42.

The radially inner chord length Si is determined above a blade root 54. The radially outer chord length Sa is determined below shroud 44. The inner chord length Si is about 1.1 times to 1.4 times the outer chord length Sa.

Sealing fin 48 or/and leading edge 50 of airfoil 46 may have provided thereon a material deposit 56 that serves to hardface the remainder of the blade material. Blade 42 may in particular be made from a titanium aluminide (TiAl). A hardfacing 56 on sealing fin 44 or leading edge 50 may be made from a ceramic material or a Ni-based material, such as, for example, boron nitride. A shroud weight 57 discussed above is identified schematically.

LIST OF REFERENCE NUMERALS 10 aircraft gas turbine
12 fan
14 casing
16 compressor
18 casing
20 combustor
22 turbine
24 high-pressure turbine
26 low-pressure turbine
27 rotor blade ring
28 hollow shaft
29 high-pressure compressor
30 shaft
31 stator vane ring
32 low-pressure compressor
33 exhaust nozzle
34 turbine center frame
36 radially outer region
38 annular space
40 gearbox
42 blade
44 shroud 46 airfoil
48 sealing element
50 leading edge
52 trailing edge
54 blade root
56 hardfacing
57 shroud weight
AR axial direction
RR radial direction
Si radially inner chord length
Sa radially outer chord length
UR circumferential direction

What is claimed is:

1. A blade for a high-speed turbine stage of an aircraft gas turbine, the blade comprising:
   a radially inner blade root;
   a radially outer shroud; and
   an airfoil extending between the blade root and the shroud;
   the outer shroud having only a single sealing element projecting radially from the shroud, the shroud being made of a brittle material and having a weight of less than 7 grams.

2. The blade as recited in claim 1 wherein the single sealing element is a single sealing fin.

3. The blade as recited in claim 1 wherein the blade is designed or suitable for an $An^2$ of $\geq 4000$ $m^2/s^2$ at the ADP of the aircraft gas turbine.

4. The blade as recited in claim 1 wherein the blade is designed or suitable for an $An^2$ of $\geq 4500$ $m^2/s^2$ at the ADP of the aircraft gas turbine.

5. The blade as recited in claim 1 wherein the blade is designed or suitable for an $An^2$ of $\geq 5000$ $m^2/s^2$ at the ADP of the aircraft gas turbine.

6. The blade as recited in claim 1 wherein the airfoil has a radially inner chord length at least 1.1 times to 1.4 times a radially outer chord length, the inner chord length being measured at the airfoil directly above the blade root, and the outer chord length being measured at the airfoil directly below the shroud.

7. The blade as recited in claim 1 wherein an entirety of the blade is made of the brittle material.

8. The blade as recited in claim 7 wherein the brittle material is a titanium aluminide alloy.

9. The blade as recited in claim 7 wherein the blade is made by casting, forging or additive manufacturing.

10. The blade as recited in claim 1 wherein the airfoil is provided with material thickenings on at least a locally thickened leading edge.

11. The blade as recited in claim 1 wherein the airfoil or the sealing element has a hardfacing formed thereon, at least in some regions, the hardfacing being made from a material different from the material of the blade.

12. The blade as recited in claim 11 wherein the hardfacing is made from a ceramic material or a Ni-based material.

13. A turbine stage for a gas turbine comprising a plurality of blades as recited in claim 1 and arranged adjacent one another in the circumferential direction.

14. The turbine stage as recited in claim 13 wherein cooling is provided for the shroud.

15. The turbine stage as recited in claim 13 wherein the blades arranged adjacent one another in the circumferential direction are configured to have different natural frequencies.

16. The turbine stage as recited in claim 15 wherein blades arranged adjacent one another in the circumferential direction differ in a geometry of the airfoil or of the shroud.

17. The turbine stage as recited in claim 14 wherein cooling fluid is supplied as the cooling in the shroud of the blades of the turbine stage from a region upstream thereof.

18. The turbine stage as recited in claim 13 wherein at least one blade of the blades has disposed thereon a blade shroud weight configured such that a static mean stress of less than 150 MPa is obtained in all sections of the blade profile.

19. An aircraft engine comprising the high-speed turbine stage as recited in claim 13 and a fan, wherein during operation of the aircraft engine, the turbine stage rotates faster than the fan.

* * * * *